INVENTORS
VICTOR E. CARBONARA
E. DOUGLAS MacDONALD
BY Ostrolenk, Faber, Gerb & Soffen
ATTORNEYS FIG. 8
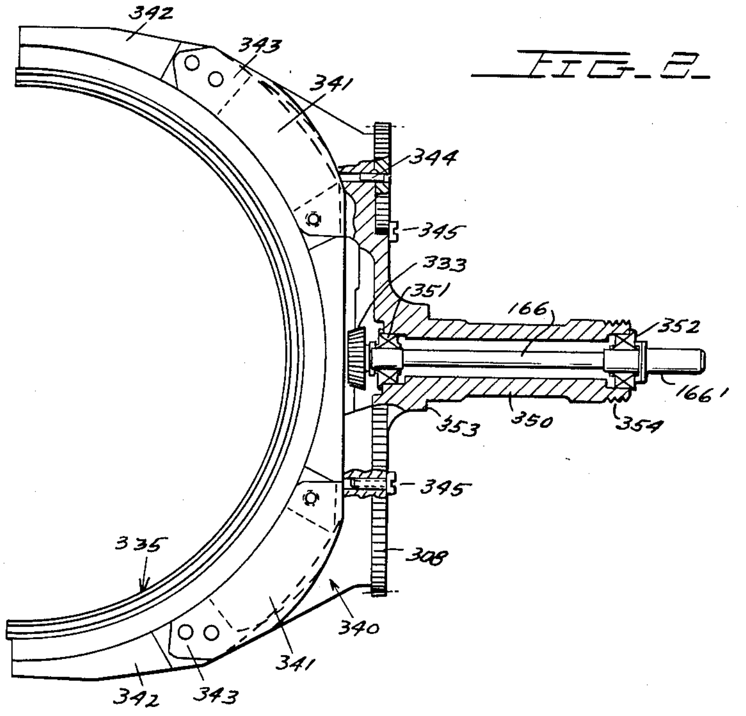
FIG. 10
FIG. 11
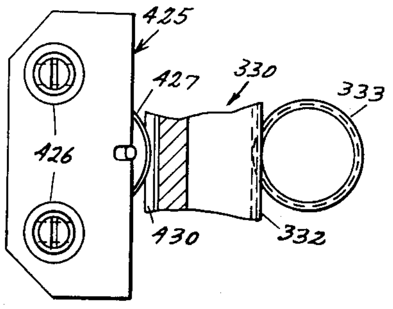
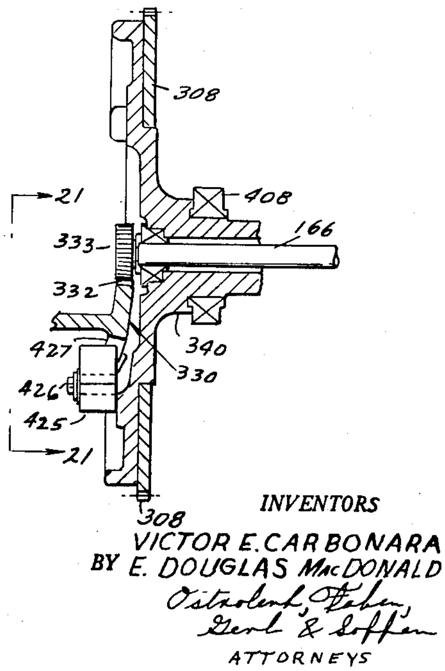
INVENTORS
VICTOR E. CARBONARA
BY E. DOUGLAS MacDONALD
Ostrolenk, Faber, Gerb & Soffen
ATTORNEYS

CELESTIAL DATA COMPUTER

Filed June 19, 1958 4 Sheets-Sheet 3

INVENTORS
VICTOR E. CARBONARA
E. DOUGLAS MACDONALD
BY Ostrolenk, Faber, Gerb & Soffen
ATTORNEYS INVENTORS
VICTOR E. CARBONARA
E. DOUGLAS MacDONALD
BY Ostrolenk, Faber, Gerb & Soffen
ATTORNEYS United States Patent Office 3,042,296
Patented July 3, 1962

3,042,296

CELESTIAL DATA COMPUTER

Victor E. Carbonara, Manhasset, and E. Douglas MacDonald, East Williston, N.Y., assignors to Kollsman Instrument Corporation, Elmhurst, N.Y., a corporation of New York Filed June 19, 1958, Ser. No. 743,105
12 Claims. (Cl. 235—61)

This invention relates to celestial data computers, and more particularly relates to novel multi-axis mechanical analog mechanism providing the celestial data.

The analog computer hereof is particularly useful in an automatic astrocompass, such as exemplified in the companion copending patent application Serial No. 743,104 filed June 19, 1958 for "Automatic Astrocompass" and also shown in Patent No. 2,998,529 issued August 29, 1961, both assigned to the same assignee. A celestial body is sighted and continuously tracked by a photoelectric sextant providing relative bearing and altitude signal determinations of the star, in the astrocompass. The celestial computer of this invention correlates a vehicle's geographic position and the celestial data of a selected celestial body and provides a continuous basic output of the celestial body's azimuth and altitude measurements. In a specific embodiment a five-axis data computer mechanizes the input data including: the geographical position of latitude and longitude; an initial setting in the computer of the Greenwich hour angle of Aries; and the celestial coordinates of the sun or a selected star, namely, sidereal hour angle and declination.

In the actual mechanization, to help initially orient the celestial tracker, an approximate value of relative bearing is obtained by combining the computed azimuth with a general approximation of heading. The computed altitude and the approximate value of realtive bearing are used to direct the sighting of the photoelectric tracker. Reference is made to the aforesaid copending application for details of such coordinated operation. The present case is primarily concerned with and claims the novel features of the data computer construction and arrangement.

The above stated objects, features and advantages of the present invention are described in an exemplary embodiment thereof illustrated in the drawings, in which:

FIGURE 2 is a side elevational view of the exemplary data computer bail and support assembly, partly in cross-section.

FIGURE 10 is a cross-sectional view through a portion of the computer head of FIGURE 9 as taken along the line 10—10 thereof.

FIGURE 11 is a side view of the bail roller support as seen along the line 11—11 in the direction of the arrows in FIGURE 10.

FIGURE 1 is a schematic diagram of the five axis mechanical analog celestial data computer 150 of the present invention.

Figure 1:
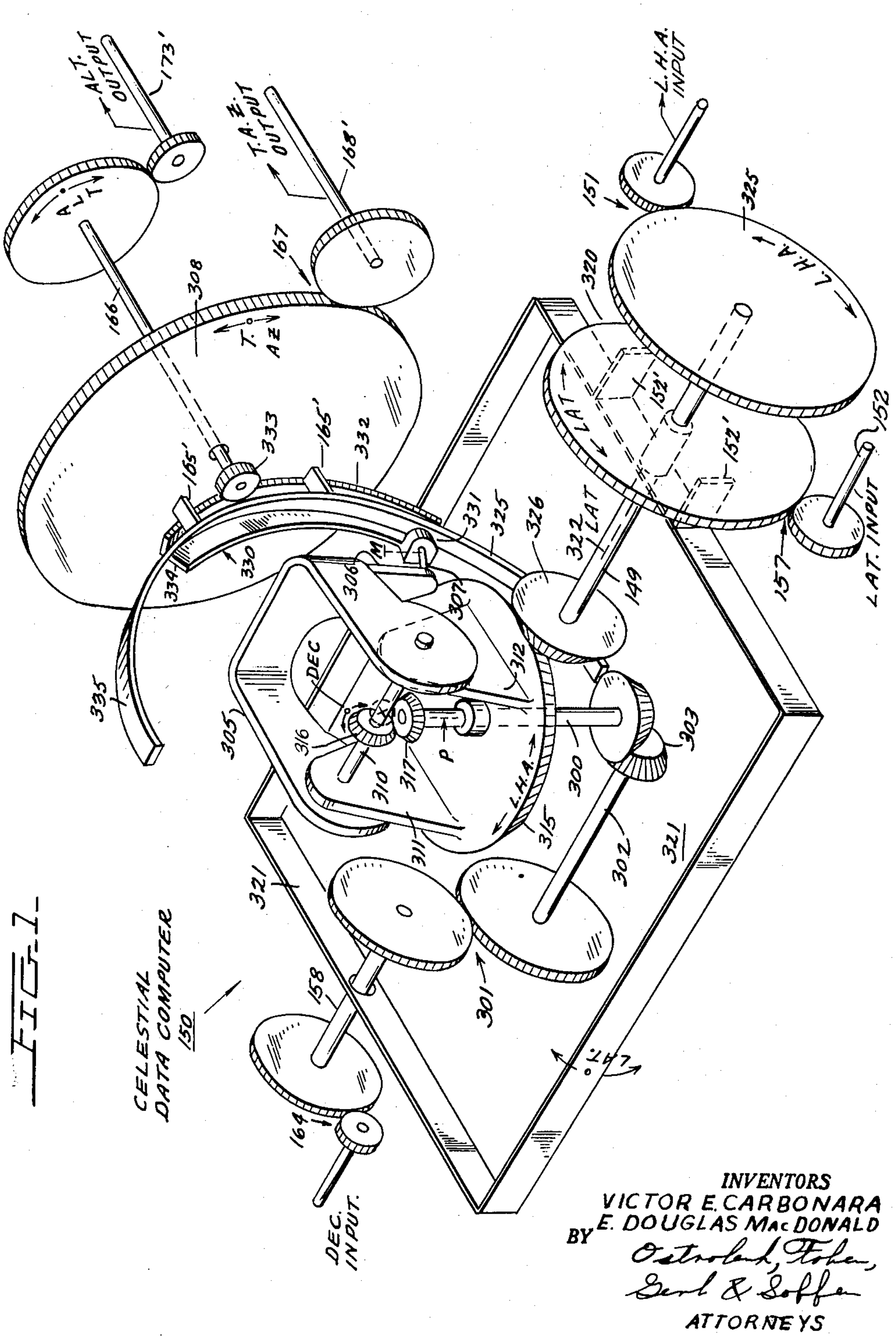
FIGURE 1 is a perspective schematic illustration of the exemplary celestial data analog mechanism.

The three angular shaft data are fed into the three input shafts of the data computer 150 mainly: L.H.A. (local hour angle) shaft 149; latitude shaft 152; and declination shaft 158, declination shaft 158 is angularly set by gearing 164 operated by servomechanism from the remote declination setting. The latitude input to data computer shaft 152 is derived through gearing 157 operated by the associated servomechanism with the latitude setting. The third input, namely that of L.H.A. to computer shaft 149, is accomplished through gearing 151 from the L.H.A. servomechanism as integrated between indicator panels A and B. The data computer 150 outputs are: the true azimuth gearing 167 which is secured to the T.A. (true azimuth) bail brackets 165, the equivalent of an output shaft for the gearing 167. The altitude output of the celestial computer is accomplished through gearing 172 secured to altitude shaft 166.

The celestial data computer 150 is arranged to represent the celestial sphere at any given moment, as used from a given geographical position, and representing a selected celestial body such as a star. FIGURES 2 to 11 illustrate the exemplary computer constructed to perform functions, operations, and produce the results for data compter 150 and corresponds to the structural arrangement shown schematically in FIGURE 1.

The data computer 150 is a mechanical analog which has four axes which intersect at a common point indicated at X. The components of computer 150, as will be set forth, represent specific celestial sphere equivalents. The vertical computer shaft 300 corresponds to the polar axis. The vertically arranged polar axis 300 intersects at the common point X. The polar shaft 300 is angularly rotated to a position corresponding to the declination of the selected star (sun or planet) through the declination measurement input at gearing 164 to input shaft 158. This is accomplished through the gear sets 301 and 303 with an intermediate shaft 302.

U-shaped rotatable head 305 is motivated by the declination 164 setting. Rotatable head 305 has an extension 306 which has a direction arm or star arm 307 extending therefrom. The star arm 307 represents the direction to the star body. The radial extension or axis of the star arm 307 is arranged to intersect at the common point X of computer 150. The point X in the mechanical system 150 represents the assumed position of the observer on earth with respect to the celestial sphere. Plate or gear 308 rotates about a center which corresponds to the zenith point Z on an axis corresponding to shaft 166 which when extended would intersect common point X in the computer.

The rotating head 305 which carries the star arm 307 is angularly set in accordance with the declination resultant input through shaft 310 rotatably mounted in stanchions 311, 312 on circular plate or gear 315. Gear 315 with stanchions 311, 312 correspond to the L.H.A. position. The ends of shaft 310 are secured to the open ends of U-shaped rotatable head 305.

A beveled gear 316 is fastened to shaft 310 and engages with beveled gear 317 secured to polar shaft 300. The star arm 307 is correspondingly motivated about the axis represented by shaft 310 in accordance with the setting of the declination input at 164 through the gearing 301, 303 to shaft 300 and the engaging beveled gears 316, 317. The axis of the declination setting shaft 310 also intersects the common point X of the computer 150 as seen in FIGURE 1.

The latitude input 157 motivates the latitude gear 320 which is secured to latitude cradle 321 through the brackets 152', 152' that correspond to a shaft input between gearing 157 and latitude cradle 321. The latitude axis 322 (indicated dotted) is normal to the polar axis P. The rotating head 305 which carries the star arm 307 is supported upon latitude cradle 321 as schematically indicated in FIGURE 1 and as shown in more detail hereinafter. The latitude cradle 321 is rotatable in space through 90° on the latitude axis 322. An axis for rotatable head 305, namely the polar axis P, is in the same plane and normal to the latitude axis 322. The star arm 307 is mounted on rotatable head 305 as set forth about an axis which is in the same plane and normal to the polar axis P. The frame of the computer 150 contains the zenith and the latitude axis which are normal to each other and in the same plane. The latitude setting positions the polar axis P in the plane of present meridian such that the angle between the zenith axis and the polar axis is colatitude.

The L.H.A. input at gearing 151 is the integrated time input for computer 150. The L.H.A. input gear 325 which is part of gearing 151 is secured to shaft 149. A bevel gear 326 meshes with L.H.A. beveled gear 315 to orient the rotatable head 305 angularly about the polar axis P in accordance with the actual L.H.A. The speed for the L.H.A. is continuous. The celestial data computer 150 contains a continuous representation of the celestial sphere with respect to the given geographic position at any instant. The direction of rotation of the L.H.A. gear 315 corresponds to the direction of rotation of the earth upon its axis within the celestial sphere with reference to the position of the observer on the earth and the hemisphere location of the observer, as represented by the computer 150 analog.

The continuously moving L.H.A. gear 315 carries stanchions 311, 312 which in turn support the adjustable rotatable head 305 and accordingly maintains the star arm 307 in its analog pointing to the star body M for the celestial triangle solution by the computer. Declination positions the star arm 307 with respect to the polar axis P, and L.H.A. rotates the star arm about the polar axis with respect to the present meridian, thus reproducing the celestial triangle. A novel bail system is employed to derive the computer true azimuth indication from the resultant composite motion of the star arm 307. The bail system is coupled to the star arm 307 and comprises an arcuate sector or rack 330 and an arcuate bail 335 engaged therewith. FIGURE 1 illustrates such arrangement schematically, and reference is made to FIGURES 2 to 11 for further details of an exemplary arrangement therefor.

The arcuate rack 330 contains a lip or projection 331 within which the projecting end of star arm 307 is rotatably engaged for a swivel action between star arm 307 and the rack 330. The arcuate sector contains a rack gear 332 which activates the altitude pinion 333 in a manner to be set forth hereinafter to derive the angular representation of the computer altitude through output gearing 172 attached to the output computer shaft 166. The arcuate rack 330 is of circular shape as is the arc of bail 335. Their circular proportioning is such as to coact smoothly whereby the arcuate sector 330 rides readily along bail 335. Means are employed for guiding and maintaining such riding relationship of the arcuate sector with respect to the bail, as will be shown in detail hereinafter.

A flange 334 is indicated on bail 330, which flange is part of the altitude output sector 330 to coact and maintain its dependent relation with bail 335. Such relation is to permit a slidable movement of sector 330 along the arcuate bail 335 but no relative movement transversely between bail 335 and arcuate sector 330. The gyrations of the star arm 307 in accordance with the combined motions imparted thereto from the declination gear 316, L.H.A. gear 315 and latitude cradle 321 result in the communication from the star arm 307 to the bail 335 of only the star arm 307 motion about the axis 166 and at the zenith point Z. Its motion produces a rotation of the bail 335 about the point Z. It is noted that the bail 335 is secured to the output gear 308 through the brackets

165', 165' which correspond in effect to the output axis. The output gear 308 and bail 335 secured thereto are in turn supported in the computer 150 frame as will be set forth hereinafter.

With the frame as a reference for bail 335, the resultant movement of star arm 307 results in a rotative component impressed upon the true azimuth output gear 308, as will now be realized by those skilled in the art. Such azimuth component motion derived from the analog representation in space of the star arm 307 for a given celestial body with the celestial and geographic data inputs through the computer 150 results in a true azimuth indication at output shaft 168'. Bail 335 which is mounted on the zenith axis 166 is accordingly positioned by the star arm 307 in celestial azimuth.

The arcuate rack 332 riding on bail 335 and positioned along bail 335 by means of star arm 307 transmits celestial altitude to the coacting altitude pinion 333 at the end of shaft 166 and to the output gearing 172 and output shaft 173'.

While the celestial data computer 150 has been hereinabove illustrated and described in connection with its use in an automatic astrocompass the computer unit 150 per se may be used for other significant purposes. For example, it may be used in a manual system for computer celestial data of selected celestial bodies to avoid tedious computations which navigators are required to do in planning their flights. The computer 150 can be used to establish or verify position information directly while in flight or may be used in precomputation of such data. The celestial data inputs through the computer will result in computed celestial altitude and azimuth outputs. Such use of a computer 150 per se is, for example: a star is selected on or near the observer's meridian when the computer 150 is used manually for flight checks. The computer has the celestial data of such star set into it, together with approximate present position. The computer will then indicate the computer altitude and azimuth of the selected star. By use of a sextant, the observed altitude is obtained. The latitude input to the computer is then changed until the computed altitude indicates the same value as the observed altitude. A second star is then selected whose true azimuth is at approximately 90° or 270°. The above computer operation is then repeated, except that the longitude input is used to match the computed altitude with the observed altitude. These two operations can be performed alternately at time intervals at the discretion of the navigator. The difference between the last two latitude readings and the time interval will give the navigator sufficient information to enable him to compute the new latitude for the next longitude reading. The longitude settings are computed in the same manner for each latitude reading.

The computer 150 per se may also be used for precomputation of log book data. In such case, the latitude and longitude of the desired check point on the course is set into the computer 150. The declination and S.H.A. (sidereal hour angle) of the selected star are set in. Then G.H.A. (Greenwich hour angle) of Aries is set, and computed altitude is read and recorded. For each subsequent computation, using the same check point less (latitude and longitude) and for the star declination and S.H.A. are used, the only resetting necessary being G.H.A. for each value and the corresponding computed altitude read and recorded.

FIGURES 2 to 11 are illustrations of component sections of an exemplary mechanical analog computer following the principles of the schematic computer showing in FIGURE 1. FIGURE 2 shows the bail support assembly partially in section. The semicircular bail 335 is assembled into a unitary assembly with the true azimuth output gear 308 and a frame structure 340. Frame 340 has extensions 341, 341 which secure rib 342 extending from bail 335 through suitable bolts 343, 343. The frame assembly 341, 341 with ribs 342 and bolts 343 correspond to the schematically indicated mechanical connections 165' to 165' between bail 335 and true azimuth output gear 308 shown in FIGURE 1. The semicircular bail 335 accordingly is rigidly mechanically connected to true azimuth gear 308, whereby rotation of bail 335 about the axis 166 coincident with the center of gear 308 produces the true azimuth bearing indications as set forth hereinabove.

The true azimuth gear 308 is in annular form centered by several pin 344 positions and secured firmly to frame 340 by bolts 345, 345. A cylindrical hollow extension 350 integrally extends from the axial central portion of bail frame 340 as seen in section in FIGURE 2. The hollow central portion of cylindrical extension 350 contains altitude output shaft 166 which is rotatably supported therein in bearings 351, 352. A pinion 333 is secured to the internal end of altitude output shaft 166 in the manner of FIGURE 1. Pinion 333 coacts with the geared rack 330 for altitude output. Rack 330 in turn rides along bail 335 as shown in more detail in FIGURES 9 and 10.

Figure 9:
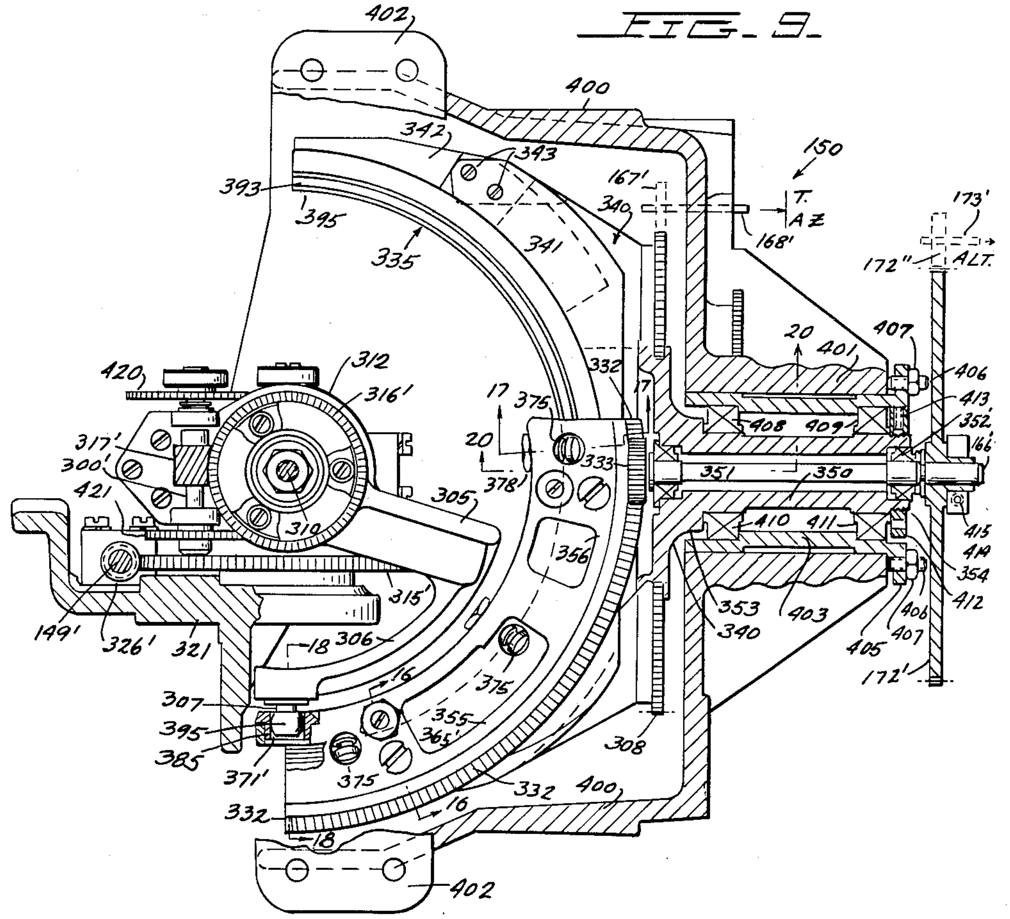
FIGURE 9 is an elevation view, partly in section, of the celestial data computer head assembly.

The cylindrical extension 350 of the bail support is rotatably mounted in the computer frame and further described in connection with FIGURE 9 hereinafter. A shoulder 353 is incorporated with extension 350 for juxtaposition with a roller bearing support for extension 350, as will be set forth. The outer end of cylindrical extension 350 is threaded at 354 for mounting a retaining ring to secure the bail assembly within the frame and against an additional roller bearing as will be described hereinafter. The bail assembly 335 is accordingly rotatable in the frame of the computer through cylindrical extension 350, and true azimuth gear output 308 reproduces the angular motion of the bail 335 along the central axis of the bail support including cylindrical extension 350. Further, the rack or carriage 330 which rides along the bail 335 (see FIGURES 9 and 10) rotates the bevelled pinion 333 to in turn rotate the altitude output shaft 166 secured therewith. The altitude output is transmitted at the shaft end 166' to an altitude output gear 172' as seen in FIGURE 9.

Figure 3:
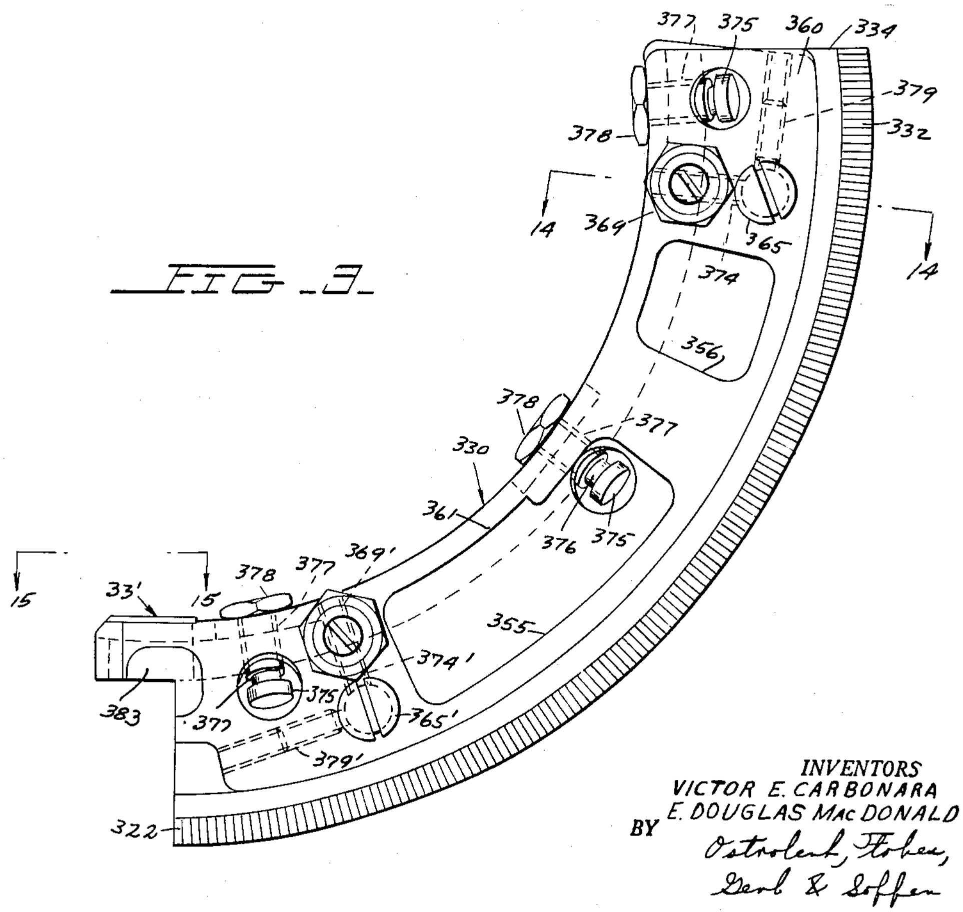
FIGURE 3 is a side elevational view of the rack assembly for the assembly of FIGURE 2.

FIGURE 3 illustrates the arcuate or rack sector 330 which is arranged to smoothly ride along bail 335. The rack or carriage 330 contains peripheral gear 332 for engagement with the altitude pinion 333 to transmit the altitude movements of the star arm 307, as described in connection with FIGURE 1. The rack 330 has a U-shaped configuration with sides 360, 361 and 362 (see FIGURE 4). These sides are trimmed of surplus areas in a manner to maintain sufficient structural strength for the carriage 330 and yet minimize its weight as indicated by the open spaces 355, 356. Rack 330 is arranged to ride smoothly up and down semicircular bail 335. Towards this end a plurality of rollers in the form of roller bearings are mounted along the carriage 330 to coact with suitable bearing surfaces of the bail 335.

Figure 4:
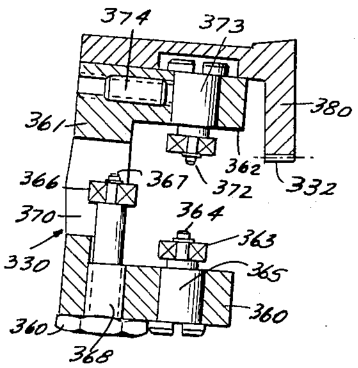
FIGURE 4 is a cross sectional view through the rack of FIGURE 3 along the line 4—4 thereof.

FIGURE 4 is a cross-sectional view through one portion of the rack 330 showing its construction and arrangement of one set of the rollers that coact with the bail. The U-shaped frame 360, 361, 362 of carriage 330 has a roller at section 4—4 (FIGURE 4) in each of the three planes corresponding to the U structure of the carriage 330. A roller 363 is supported in pin 364 extending from post 365 secured in U-frame section 360 by set screw 379. A roller 366 is secured on pin 367 extending from post 368 secured in frame section 360 by nut 369. Roller 366 clears the U-frame portion 361 through opening 370. Bearing 366 though mounted on frame section 360 corresponds to the roller for the intermediate U-frame portion 361. A third roller 371 is supported in pin 372 extending from post 373 secured in U-frame section 362 by set screw 374.

The rollers 363 and 371 are coaxial and spaced across a gap within the U-frame of carriage 330 for coaction with the bail 335. The coaction of rollers 363, 366 and 371 with bail 335 is shown and described in more detail in connection with FIGURE 6 hereinafter. An additional set of three rollers identical to the set 363, 366, 371 of FIGURE 4 is incorporated at the other end of the carriage 330 and indicated at 365' and 369' in FIGURE 3. Additionally three identical sets of twin roller assemblies are arranged along carriage 330 corresponding to those to be shown and described in connection with FIGURE 7. Such additional rollers are shown at 375 in FIGURE 3 with one centrally of carriage 330 and two others at the opposite ends.

Rollers 375 are utilized to prevent lateral displacement of bail 335 with respect to rack 330 as will be described in connection with FIGURE 7. The rollers 375 are rotatably mounted on pins 376 extending from threaded posts 377 in central portion 361 of the U-frame of rack 330 and each secured with a nut 378. The rack gear 332 is formed in an L-shaped member 380 projecting at a suitable region with respect to the U-shaped rack 330 for coaction with the altitude pinion 333. The gear sector 380 is suitably secured to frame portion 362 of the U-frame as with screws or bolts. FIGURE 8 illustrates the securement of gear sector 382 to U-section 362 with a machine screw 381. Several of such positions with machine screws firmly secure gear sector 380 to the U-framed rack 330.

Figure 5:
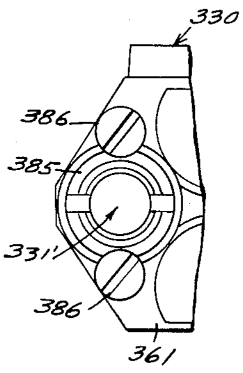
FIGURE 5 is a plan view of the rack swivel star arm securement portion, as viewed at line 5—5 in FIGURE 3.

FIGURE 5 is a plan view of the swivel joint 331' within which swivel head M of the star arm 307 coacts in a manner indicated in schematic FIGURE 1 and more fully illustrated in FIGURES 8 and 9 hereinafter. The swivel head cavity is seen as 383 in FIGURE 3. A cap 385 closes cavity 383 when the swivel head of the star arm is lodged therein. Screws 386, 386 secure cap 385 on the frame portion 361 of rack 330.

Figure 6:
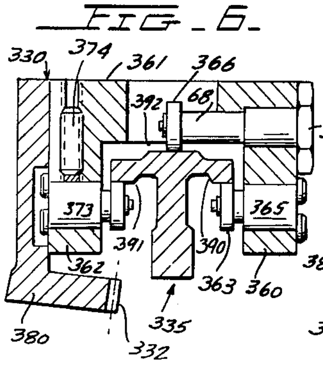
FIGURES 6, 7 and 8 are cross-sectional views through corresponding sections of the exemplary computer shown in FIGURE 9.
Figures 7, 8:
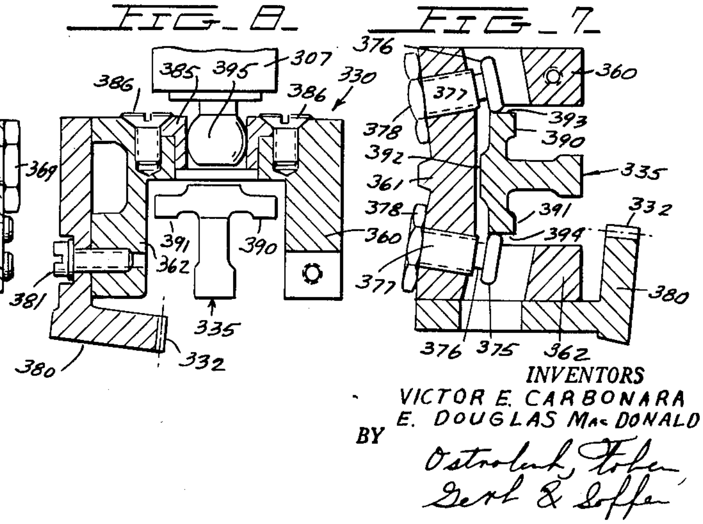

FIGURES 6, 7 and 8 are corresponding cross-sections taken along the assembled rack and bail 330, 335 at the corresponding cross-sectional points in assembly FIGURE 9. FIGURE 6 corresponds to FIGURE 4 described above, with the cross-section of bail 335 seen within U-shaped carriage 330. The coaxial rollers 363, 371 are arranged to coact with corresponding smooth faces of T-shaped bail 335; roller 363 rides on smooth arcuate face 390; and roller 371 on face 391. Central roller 366 rides against the top central machined face 392 of bail 335. The faces 390, 391, 392 of bail 335 are smoothly machined and accurately executed in order that bail 335 ride precisely with respect to the rollers. The positioning rollers 363, 366, 371 are accurately positioned within the carriage 330 to precisely coact with the faces 390, 391 and 392 of bail 335.

The coaction of the bail roller faces 390, 391, 392 and roller sets of rack 330 shown in FIGURE 6 serves to prevent any in-out displacement of carriage 330 with respect to bail 335. Another set of rollers, identical to rollers 363, 366, 371 of FIGURES 4 and 6, are located in a symmetrical position at the opposite end of carriage 330 as shown in FIGURE 3. Thus, in-out displacement of the bail and carriage arrangement 330, 335 is eliminated by these two pairs of rollers while permitting the carriage 330 to ride up and down the bail 335 in accordance with motivations of the star arm described in connection with FIGURE 1.

Transverse displacement of the bail 335 with respect to carriage 330 is avoided by the use of three sets of roller pairs 375, 375 as shown in cross-sectional FIGURE 7. Bail 335 is arranged with smooth outside faces 393, 394 for precise coaction with the rollers 375, 375. The axes of rollers 375 are inclined with respect to the central axis of bail 335 whereby the outer coacting surfaces 393, 394 thereof are also inclined. This enhances the lateral locking of the bail 335 with respect to carriage 330. The three sets of rollers 375, 375 arranged along the carriage 330 have been found to inhibit lateral displacement with respect to the bail and carriage assembly. The rollers of the carriage are preferably arcuate roller bearings to minimize frictional drag on the movement of the carriage 330 with respect to bail 335.

FIGURE 8 is a cross-sectional view through the carriage bail assembly at the swivel joint section, through the line 8—8 of assembly FIGURE 9. The U-framed carriage 330 is mechanically connected with the star arm 307 (see FIGURE 1) through the swivel head 395 projecting from star arm 307. The swivel head 395 is seated within a suitable cap 385 fastened to the frame of carriage 330. Since the radial position swivel head 395 in the mechanism is maintained constant, as is the radial position with respect to the star arm of the common pivotal point of carriage 330, there is no problem about radial displacement between the bail, carriage, and swivel head 395.

The mechanical gyrations executed by the star arm 307 cause the swivel head 395 to motivate the carriage 330 and the bail 335 therewith to execute the required true azimuth displacement of the bail 335 as described in connection with FIGURE 1 and the altitude of the celestial body as executed by the star arm 307 to the carriage position 330 with respect to bail 335. FIGURE 9 is an elevational view, partly in section, through the exemplary analog mechanical celestial data computer 150. The movable analog mechanism of computer 150 is housed in a stationary main frame 400 having a frame extension 401 and a cross bar frame 402. The bail support assembly as illustrated and described in connection with FIGURE 2 is rotatably mounted within the frame extention 401. A sleeve 403 is inserted within the central opening of frame extension 401. Sleeve 403 has a flange 404 which is secured to frame 401 through threaded posts 406 and bolts 407.

The cylindrical extension 350 of the bail support assembly is rotatably supported within sleeve 403 through spaced roller bearings 408, 409. Roller bearing 408 is fitted between shoulder 353 of extension 350 and a shoulder 410 in sleeve 403. Bearing 408 is fitted between shoulder 411 of sleeve 403 and a locking ring 412 fitted upon the extension 354 of cylinder 350. A set screw 413 locks ring 412 in position after suitable assembly. As described hereinabove in connection with FIGURE 2, the altitude shaft 166 extending from altitude pinion 333 is rotatably mounted within the cylindrical extension 350 of the bail support in roller bearings 351 and 352. The shaft 166 extends beyond the retaining ring 412. The shaft extension 166′ of altitude shaft 166 has altitude output gear 172′ secured thereto. A collar 414 with set screw 415 suitably secures output gear 172′ to shaft 166. The altitude output from the computer 150 is thereupon transmitted to pinion 172″ and to altitude output shaft 173′ (see also FIGURE 1).

Rotation of bail assembly 335 carries with it integrally secured gear 308 which represents the true azimuth output of the computer 150 (see FIGURE 1). An output pinion 167′, indicated in dotted lines, is coupled to azimuth gear 308, and transmits the true azimuth output to shaft 168′ (see also FIGURE 1).

The interior section of computer 150 constitutes the declination and L.H.A. head assembly movable within the semi-circular bail 335, as seen in FIGURE 9. The rotatable head 305 motivates star arm 307 through depending bracket 306. The motivated star arm 307 displaces the carriage 330 and bail 335 slidably attached thereto through the swivel head connection 395. Displacement of the rack or carriage 330 along the bail 335 causes the altitude pinion 330 to correspondingly rotate through the movement of rack gear 332. An accurate measure of the celestial body altitude, per the computer movements, is accordingly transmitted to the altitude output shaft 173′ in the manner already described. This important feature of the invention results in an accurate computer altitude of the selected celestial body, as well as its accurate true azimuth through the corresponding movement of bail 335 about its bail support axis through the cylindrical support extension 350.

Bail 335 moves with its support frame 340 assembly about the axis of the integral cylindrical extension 350 and with respect to the fixed frame work 400, 401 of the computer 150. The corresponding rotation of the gear 308 integral with the bail assembly 335 rotates the pinion 167′ to produce the true azimuth output at shaft 168′ external of frame 400. The declination displacement is provided in the rotating head assembly 305 through the circular pivoted ends 316′ integrally extending from head 305. Head 305, as described in FIGURE 1, is pivotally mounted with respect to the axis of declination shaft 310. The circumference of the surfaces 316′ have suitable gear teeth to engage helical gears 317′. Gears 316′ and 317′ correspond to declination gears 316 and 317 of the schematic system of FIGURE 1.

Rotation of helical gear 317′ positions the rotatable head 305 in suitable declination. The declination gear 317′ is secured to shaft 300′ which in turn is motivated through successive spur gearing including gears 420, 421 corresponding to gear train 301, 302, 303 extending between the declination gears 316, 317 and the input declination gearing 164 to the computer as per FIGURE 1. The latitude cradle 321 rotatably supports the L.H.A. gear 315′. The L.H.A. gear 315′ is driven by pinion 326′ which is connected to the L.H.A. shaft 149′ which extends through the computer to the L.H.A. input gearing 151 (not shown).

Further detailed gearing is omitted from FIGURE 9 for the sake of clarity of presentation of this complex mechanical structure. However, the relationship of such ancillary gearing and their connection external to the frame 400, 401, 402 are as fully represented in the overall schematic computer 150 in FIGURE 1, as will now be evident to those skilled in the art. The declination L.H.A. and the latitude inputs to the computer mechanism result in activation of the rotatable head 305 and star arm 307, all as described in connection with the overall system of FIGURE 1. Resultant true azimuth and altitude outputs are derived at respective output shafts 168′ and 173′.

FIGURE 10 is a cross-sectional view through the computer assembly of FIGURE 9 taken along line 10—10 through the engagement of the altitude pinion 333 with rack gear 332. FIGURE 11 is a view taken along the line 11—11 facing this gear and pinion engagement at 332, 333. A fixed roller assembly 425 is secured to the bail frame 340 through machine screws 426, 426. A roller 427 is rotatably mounted within assembly 425, preferably on a roller bearing and at the angle as seen in FIGURE 10. Roller 427 engages with a machined surface 430 of the carriage assembly 330 opposite and parallel to the gear sector 332 thereof. The location of roller 427 is exactly opposite the point of engagement of rack gear 332 with the relatively fixed pinion 333.

It will be recalled in the description of FIGURE 1 that the center point of pinion 333 represents the zenith of the mechanical analog computer 150. The roller 427 is provided to ensure the continuous engagement of the rack gear 332 with the pinion 333. This occurs despite the rotation of the bail support and bail assembly 335 that carries the roller assembly 425 or of the movement of the rack 330 along the bail 335, since the altitude pinion 333 is relatively fixed with respect to the bail assembly 335. The rack assembly 330 moves between roller 427 and the pinion 333 on semi-circular bail 335, ensuring engagement with the rack gear 332 and transmitting the computed altitude of the celestial body to altitude pinion 333.

Although the present invention has been described and illustrated with an exemplary embodiment and preferred mode of operation, it is understood not to be so limited since changes and modifications may be made therein which are within the full intended scope of the invention as defined by the appended claims.

We claim:

1. A celestial data computer comprising a frame, a member along a designated declination axis carried by said frame, a head angularly displaceable by said member, declination input means coupled to said member to angularly set said head to correspond to the declination of a selected star, a star-arm extending from said head, means for angularly displacing said head in accordance with the local hour angle, means for angularly shifting said frame to correspond with the latitude of the selected star, whereby said star-arm is positioned in analog relation to the selected star in a celestial sphere representation, bail means coupled to said star-arm, and mechanism operable by said bail means for deriving navigational data relative to the selected star through the star-arm analog positions.

2. A celestial data computer comprising a frame, a member along a designated declination axis carried by said frame, a head angularly displaceable by said member, declination input means coupled to said member to angularly set said head to correspond to the declination of a selected star, a star-arm extending from said head along a line intersecting the designated declination axis, means for singularly displacing said head and star-arm in accordance with the local hour angle and about an axis corresponding to the polar axis, latitude input means for angularly shifting said frame to correspond with the latitude of the selected star, whereby said star-arm is positioned in analog relation to the selected star in a celestial sphere representation, bail means coupled to said star-arm, and mechanism operable by said bail means for deriving navigational data relative to the selected star through the star-arm analog positions.

3. A celestial data computer as claimed in claim 2, in which said star-arm line, declination axis and polar axis intersect at a common point.

4. A celestial data computer as claimed in claim 1, futher including means associated with said mechanism for deriving altitude determinations of the selected star.

5. A celestial data computer as claimed in claim 1, further including means associated with said mechanism for deriving true azimuth determinations of the selected star.

6. A celestial data computer as claimed in claim 2, further including means associated with said mechanism for deriving altitude and azimuth determinations of the selected star.

7. A celestial data computer as claimed in claim 1, in which said bail means includes an arcuate sector, a swivel connection effecting a drive coupling relation of said sector with said star-arm, and means coupled to said sector for providing altitude determinations of the selected star.

8. A celestial data computer as claimed in claim 1, in which said bail means includes an arcuate sector, a swivel connection effecting a drive coupling relation of said sector with said star-arm, an arcuate bail member in mechanical coaction with said sector, and means coupled to said bail member providing true azimuth determinations of the selected star.

9. A celestial data computer as claimed in claim 2, in which said bail means includes an arcuate sector, a swivel connection effecting a drive coupling relation of said sector with said star-arm, an arcuate bail member in mechanical coaction with said sector, means coupled to said sector for providing altitude determinations of the selected star, and further means coupled to said bail member providing true azimuth determinations of the selected star.

10. A celestial data computer as claimed in claim 7, in which said sector coupling means includes a take-off pinion in engagement with a rack gear along said sector for star altitude determinations.

11. A celestial data computer as claimed in claim 8, in which said bail member coupling means includes a gear secured to said bail member and a take-off pinion engaged therewith for star azimuth determinations.

12. A celestial data computer as claimed in claim 3, in which said bail means includes an arcuate sector, a swivel connection effecting a drive coupling relation of said sector with said star-arm, an arcuate bail member in mechanical coaction with said sector, means coupled to said sector for providing altitude determinations of the selected star, and further means coupled to said bail member providing true azimuth determinations of the selected star, in which the sector coupling means includes a take-off pinion in engagement with a rack gear along said sector, and in which said bail member coupling means includes a gear secured to said bail member and a take-off pinion engaged therewith, said bail member gear being rotatable about the axis of said sector take-off pinion, which sector pinion axis intersects the said common point.

References Cited in the file of this patent

UNITED STATES PATENTS

| | | |
|---|---|---|
| 583,518 | Stoller | June 1, 1897 |
| 1,346,412 | Meitner | July 13, 1920 |
| 1,852,166 | Kaster | Apr. 5, 1932 |
| 2,077,398 | Clark | Apr. 20, 1937 |
| 2,444,933 | Jasperson | July 13, 1948 |
| 2,508,027 | Hoffmeister | May 16, 1950 |
| 2,599,381 | Gerks | June 3, 1952 |
| 2,724,895 | Young | Nov. 29, 1955 |
| 2,748,485 | Newell | June 5, 1956 |
| 2,758,377 | Claret et al. | Aug. 4, 1956 |
| 2,762,123 | Schultz et al. | Sept. 11, 1956 |
| 2,857,672 | McCoy | Oct. 28, 1958 |